No. 630,357. Patented Aug. 8, 1899.
H. J. KIMMAN.
PORTABLE PNEUMATIC DRILL.
(Application filed Aug. 8, 1898.)
(No Model.) 5 Sheets—Sheet 3.
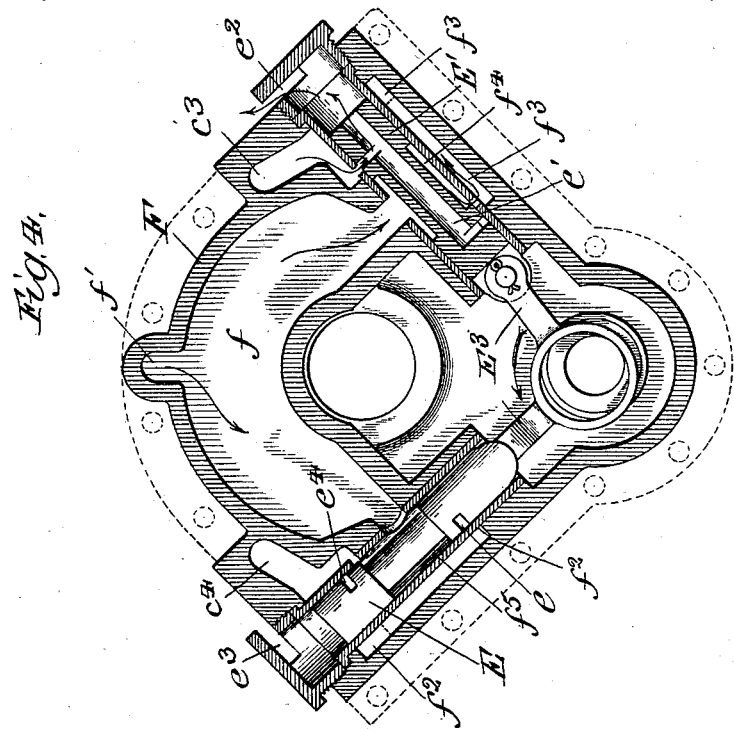
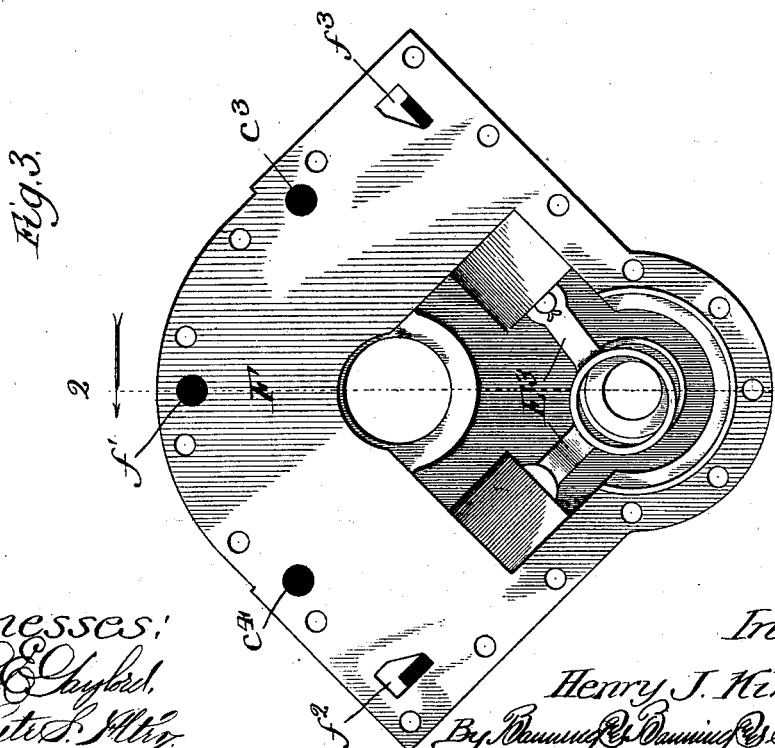
Witnesses:
Inventor:
Henry J. Kimman,

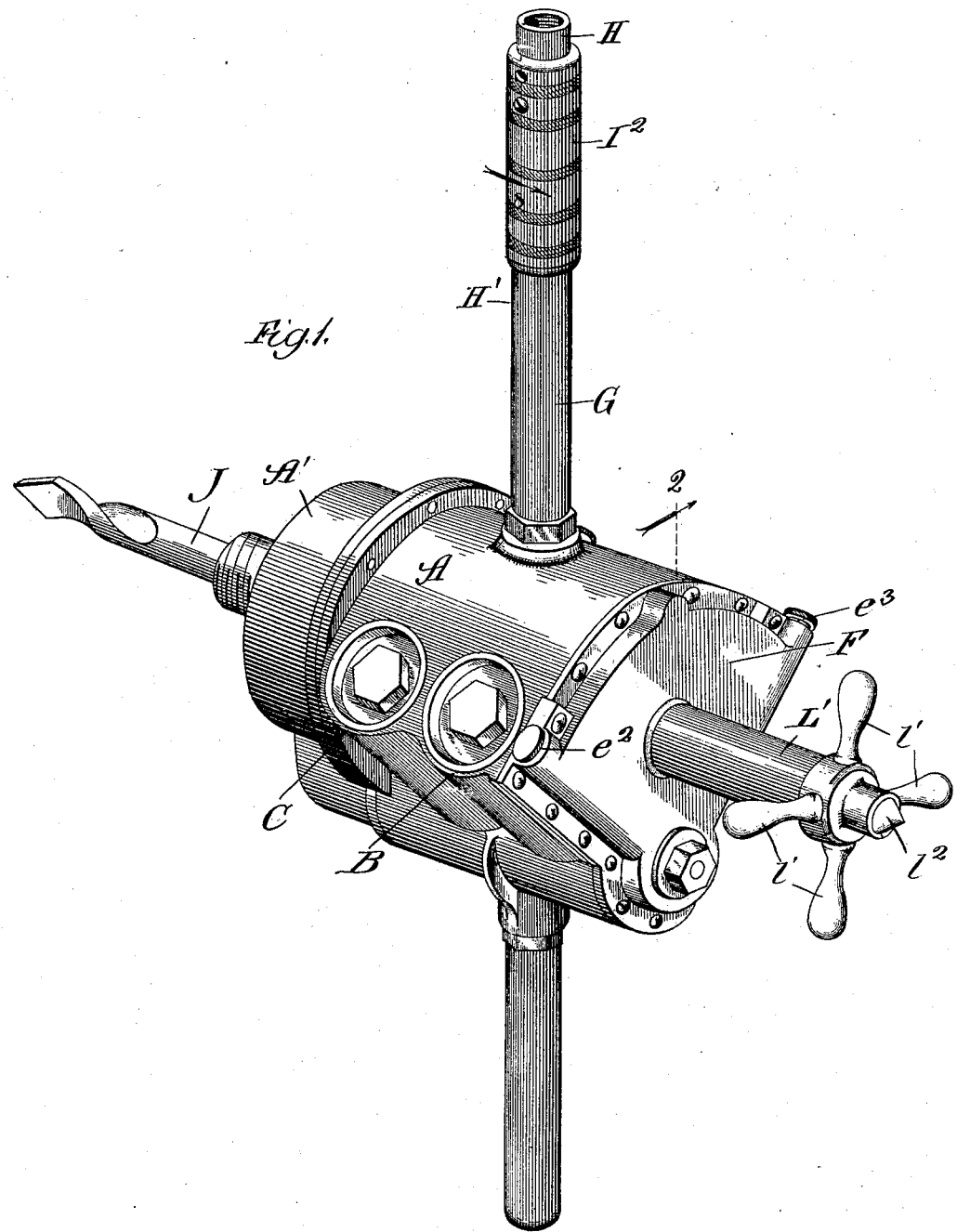

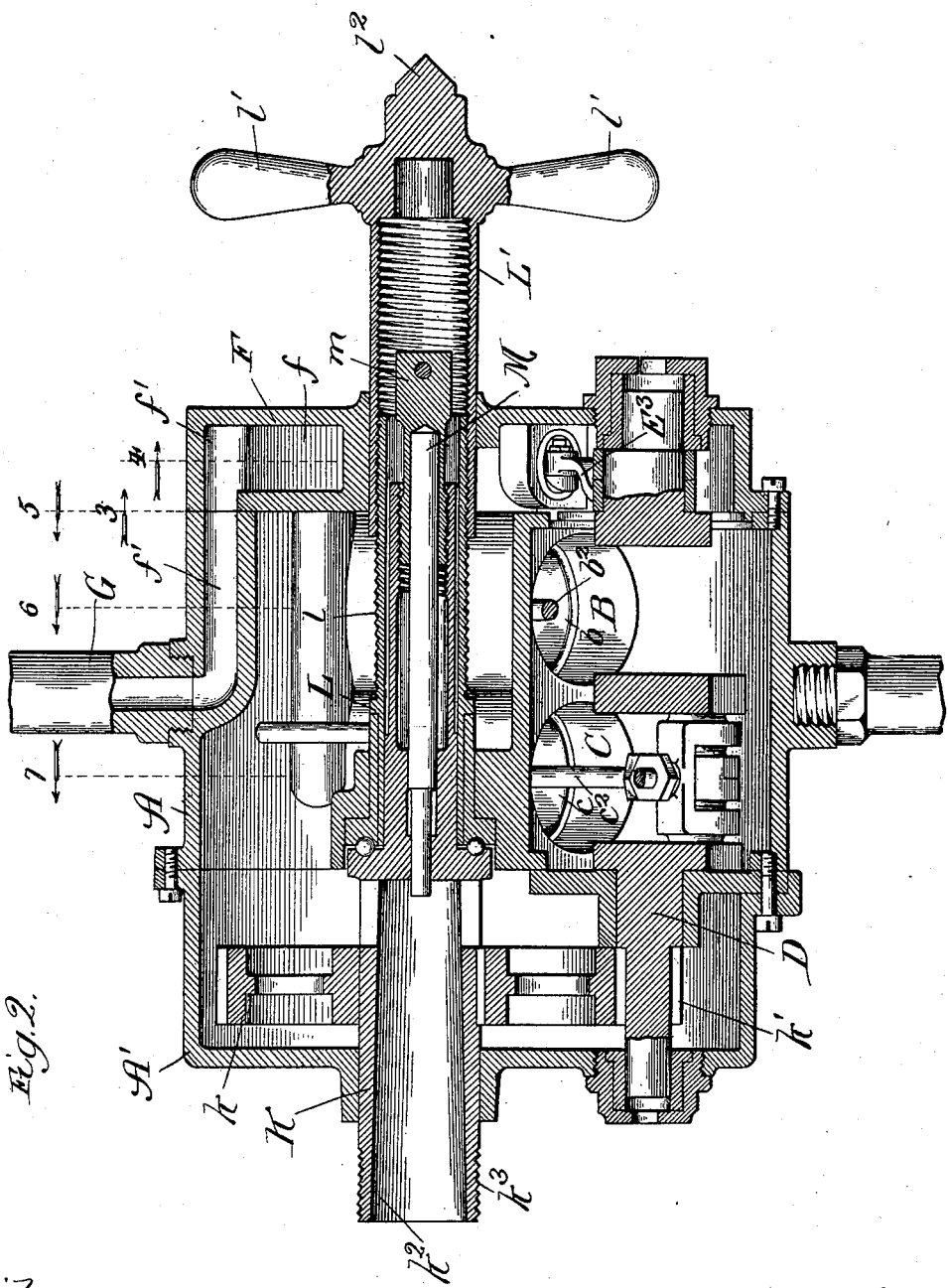

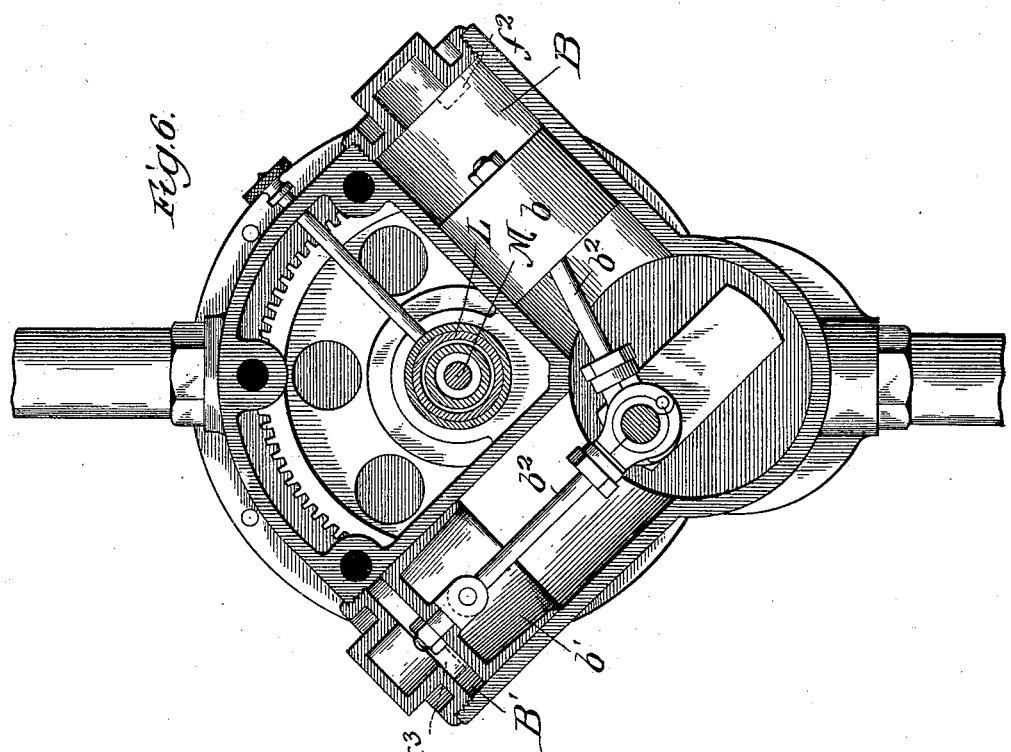
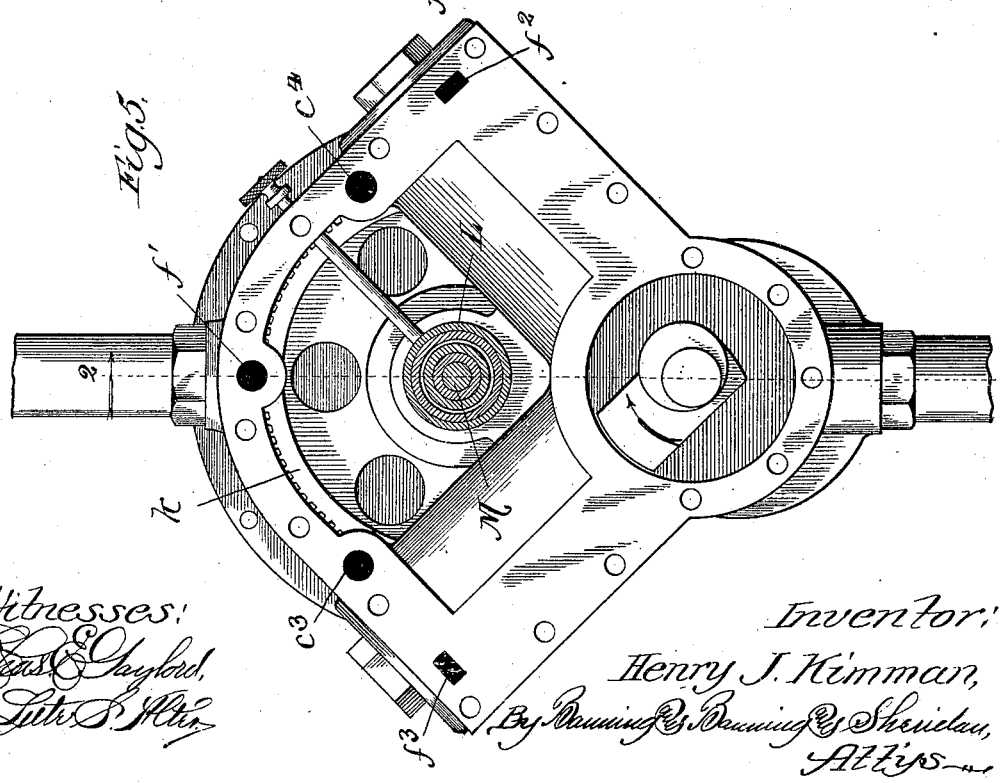

No. 630,357. Patented Aug. 8, 1899.
H. J. KIMMAN.
PORTABLE PNEUMATIC DRILL.
(Application filed Aug. 8, 1898.)
(No Model.) 5 Sheets—Sheet 5.
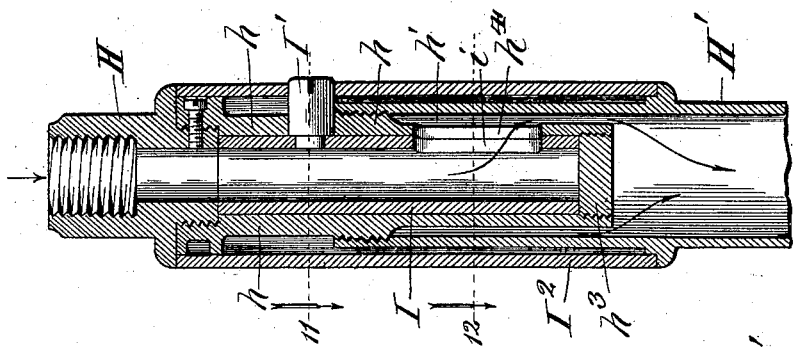
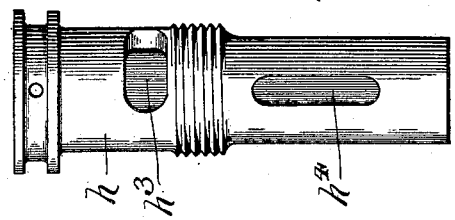
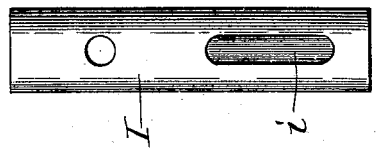
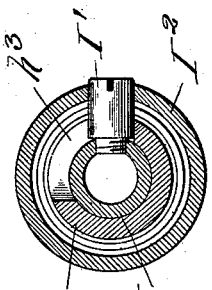
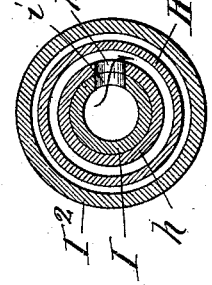
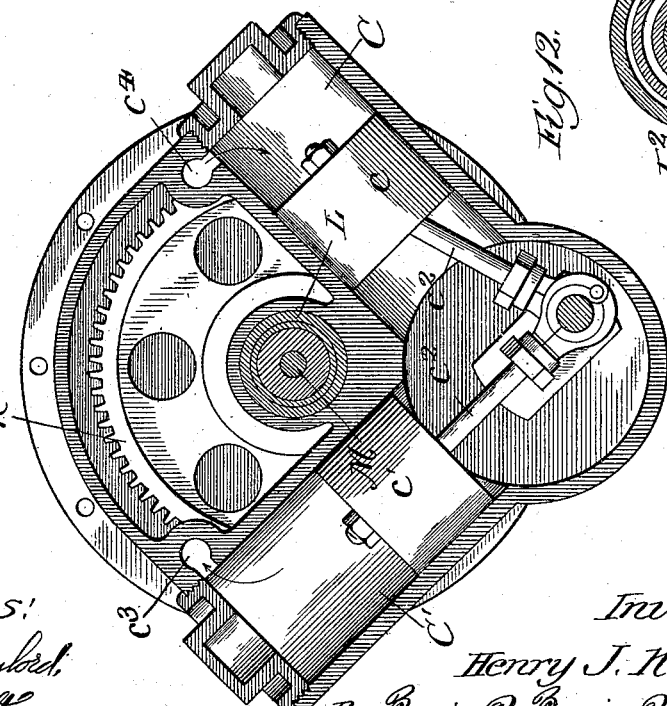
Witnesses:
Inventor,
Henry J. Kimman,

UNITED STATES PATENT OFFICE.

HENRY J. KIMMAN, OF CHICAGO, ILLINOIS, ASSIGNOR OF ONE-HALF TO EDWARD NASH HURLEY, OF SAME PLACE.

PORTABLE PNEUMATIC DRILL.

SPECIFICATION forming part of Letters Patent No. 630,357, dated August 8, 1899.

Application filed August 8, 1898. Serial No. 688,088. (No model.)

*To all whom it may concern:*

Be it known that I, HENRY J. KIMMAN, a citizen of the United States, residing at Chicago, in the county of Cook and State of Illinois, have invented certain new and useful Improvements in Portable Pneumatic Drills, of which the following is a specification.

My invention relates to that class of mechanisms in which there are combined fluid-pressure engines which are portable in their nature and which are adapted to and are connected with other mechanisms, such as drills, for the purpose of assisting in hand labor and minimizing the cost incident to the manufacture of large machines.

The principal object of my invention is to produce a simple, economical, and efficient portable pneumatic drill.

A further object of my invention is to provide a simple, economical, and efficient portable pneumatic drilling mechanism having combined therewith several fluid-pressure cylinders, all arranged in one compact organized tool.

The invention consists principally in the combination of at least two sets of fluid-pressure cylinders arranged in parallel lines, a reciprocating piston in each cylinder, a rotatable crank-shaft connected with the piston, a reciprocating valve for each line of parallel-arranged cylinders, and drill-holding mechanism connected with the crank-shaft and arranged to be driven thereby.

The invention consists, further and finally, in the features, combinations, and details of construction hereinafter described and claimed.

In the accompanying drawings, Figure 1 is a perspective view of an organized machine constructed in accordance with my improvements; Fig. 2, a longitudinal sectional elevation taken on the lines 2 of Figs. 1, 3, and 5; Figs. 3 and 4, cross-sectional views taken on the lines 3 and 4 of Fig. 2, looking in the direction of the arrow; Fig. 5, a cross-sectional view taken on the line 3 5 of Fig. 2, looking in the direction of the arrow. Figs. 6 and 7 are cross-sectional views taken on the lines 6 and 7 of Fig. 2, looking in the direction of the arrow; Fig. 8, a longitudinal sectional elevation of the throttle-valve, taken on line 8 of Fig. 1. Figs. 9 and 10 are detail views of the throttle-valve, and Figs. 11 and 12 cross-sectional views taken on the lines 11 and 12 of Fig. 8.

In constructing a portable pneumatic drill in accordance with my improvements I make a main casing A of the desired size, shape, and strength, preferably segmental in contour, as shown in the accompanying drawings, and which is adapted to support, contain, and inclose practically all of the operative and other parts of the machine, as well as to efficiently protect the same from exterior influences, such as dust, dirt, and the like. In this casing I preferably arrange two sets of fluid-pressure cylinders, located in different planes and in parallel lines, the cylinders in each set preferably being arranged at right angles to each other. These cylinders, as above stated, are arranged in sets, the first set consisting of the cylinders B and B', the second set consisting of the cylinders C and C', and, as above stated, arranged substantially at right angles to each other, so that the movable pistons $b$, $b'$, $c$, and $c'$, which are arranged therein, acting through the medium of their respective piston-rods $b^2$ and $c^2$, bear on the crank-shaft D at different times and in different positions, so as to avoid what is commonly known as the "dead-center" and at the same time to give the successive impulses to the crank-shaft and provide for uniform rotation of the same, with the practically constant transmission of power and motion.

In order to economically provide for the admission of fluid-pressure into the cylinders and for the exhaust of the same, I provide two piston-valves E and E', which are arranged in what I term a "valve-casing" F, which is of the same contour as the main casing. These piston or controlling valves are further arranged so that there is one for each line of parallel-arranged cylinders and also substantially at right angles to each other, while their movements are so timed as to permit of the admission of fluid-pressure and its subsequent exhaustion.

The valve-casing is provided with a main pressure-chamber $f$, having communication with the supply-pipe G by means of the channel $f'$. The cylindrical chambers of the first set have communication with the fluid-pressure chamber through the medium of the controlling-valves by means of the channels $f^2$ and $f^3$, the location of which is shown in dotted lines in Figs. 4 and 6 and in full lines in Fig. 3, so that as the piston-valves are reciprocated or moved fluid-pressure may flow from the pressure-chamber $f$ through the chamber $f^4$, formed by the annular channel in the valve E′, thence through the passage $f^3$, and down through the same into the space between the piston-head and the casing to operate the piston. During the operations of the mechanism the piston-valve E′ is so operated as to close communication between the pressure-chamber and the channel $f^3$ and bring its longitudinal passage $e'$ into registration with the passage $f^3$, so that the fluid-pressure may be exhausted from the cylinder B, and thus permit such cylinder to be returned, the pressure passing out through the opening $e^2$ in the valve-chamber head.

The pressure is admitted and exhausted from the cylinder B′, passes in through the opening and into the chamber formed by the annular channel $f^5$ in the piston-valve, so that when such channel is brought into registration with the irregular channel $f^2$ the pressure flows through from the main pressure-chamber through the chamber $f'$ and channel $f^2$ into the cylinder B′ between the head thereof and the piston to operate the same. When the piston has reached the limit of its forward movement, the reciprocating valve has been operated by its rod $E^3$, which is connected with the crank-shaft, so as to bring its longitudinal passage $e$ into alinement with the irregular passage $f^2$ and permit the fluid-pressure to be exhausted through the opening $e^3$ into the valve-chamber head.

In order to supply fluid-pressure to and exhaust it from the second set of cylinders, such second set of cylinders, as shown in Fig. 7, are provided with channels $c^3$ and $c^4$. (Shown also in Figs. 3 and 4.) The same controlling piston-valves operate to open and close these passages, so that pressure may flow from the main pressure-chamber through the annular chamber $f^4$, and, when it is brought into register therewith, through the channel $c^3$ into the cylinder C′ between its casing and the movable piston, to operate the piston. As shown in Fig. 4 of the drawings, the controlling piston-valve E′ is in condition to permit of the exhaust, so that fluid-pressure may flow through the channel $c^3$ and into the longitudinal passage $e'$ of the controlling-valve and out through the opening $e^2$ into the valve-chamber head.

With regard to the operations of the piston $c$ in the cylinder C, the fluid-pressure passes from the fluid-pressure chamber in the valve-casing into the annular channel $f^5$, from thence into the passage or channel $c^4$, and, as shown in Fig. 7, into the cylinder between the piston and the cylinder-head to operate such piston. The exhaust is accomplished when the controlling piston-valve is moved so that the slot $e^4$ coincides with the perforation in the channel $c^4$, so as to permit fluid-pressure to exhaust from the cylinder to the channel $c^4$, perforation or slot $e^4$ into the longitudinal passage $e$ of the controlling-valve, and out through the slotted opening $e^3$ in the valve-chamber head. By this construction and arrangement it will be seen that there is a controlling piston-valve made in a certain specific form and provided with specific channels for controlling two reciprocating pistons arranged in multiple relation and parallel therewith and with each other, thus providing for a compact organized portable pneumatic drill.

In order to provide a simple, economical, and efficient main valve and shut off the supply of fluid-pressure, I make a throttle-valve, as shown in Figs. 8, 9, 10, 11, and 12, in which there is combined a supply tube or pipe H, having a sleeve or tube $h$ secured thereto, so as to extend therein and provide an annular chamber $h'$ between it and the continuation H′ of the supply-pipe.

An inner cylindrical valve I is held in place in the inwardly-extending tube by means of the plug $h^2$. This cylindrical valve is secured to a shell or handle $I^2$ by means of the screw I′, which operates in the slot $H^3$ in the inwardly-projecting tubular extension of the supply-pipe. The tubular extension of the supply-pipe and the cylindrical valve are provided with perforations or openings $h^4$ and $i$, which are adapted to register with each other when the handle portion is turned to the proper position, or to be cut off from registering with each other, so as to permit of the entrance of fluid-pressure, as indicated by the arrows, or to cut off the supply thereof.

In order to economically combine a portable pneumatic or fluid-pressure engine with drilling mechanism, so as to provide a compact organized machine-tool, I provide the casing with an extension A′, in which is mounted in suitable bearings a rotatable holding-sleeve K, having a spur-gear $k$ secured thereto. This spur-gear $k$ meshes with a spur-pinion $k'$ on the crank-shaft, so as to be rotated thereby and also rotate the holding-sleeve. The holding-sleeve is provided with a tapered opening $k^2$ and an exteriorly-threaded portion $k^3$, the first for the reception of the tapered shank of drills like that shown at J in Fig. 1 and the second to receive the threaded hubs or bushings of chucks and similar mechanisms.

In order to provide for economical feeding of the tool into the proper position, I provide a sleeve L, which forms an independent extension of the tool-holding sleeve and which is threaded at $l$, so as to be engaged by a feed-screw L′, having threaded engagement therewith, and which is provided with a star-handle $l'$ and pivot $l^2$.

To assist in expelling the tool from the tool-holding sleeve whenever it becomes too firmly seated therein, I provide the sleeve with a drift-pin M, which is held in place by means of an ejecting-screw m, so that by turning the ejecting-screw by means of a pin or otherwise the drift-pin is forced in and expels the drill; but when moved in the other direction it permits the drift-pin to be moved backwardly and not interfere with the engagement of the drill or other tool with the tool-holding sleeve.

I claim—

1. In a portable pneumatic drilling-machine, the combination of at least two sets of fluid-pressure cylinders arranged in different planes and in lateral parallel lines to a crank-shaft and having at least two cylinders in each set with the cylinders of a set standing diagonal and in a substantially transverse parallel line to each other on opposite sides of the crank-shaft, a reciprocating piston in each cylinder, a crank-shaft connected with each piston, a controlling reciprocating valve on each side of the crank common to all the cylinders on the same side of the crank-shaft arranged diagonal to each other and parallel with the cylinders and connected with and operated from the crank-shaft for admitting and exhausting fluid-pressure to and from each line of laterally-arranged cylinders, and drill-holding mechanism connected with and adapted to be rotated by the crank-shaft, substantially as described.

2. In a portable pneumatic drilling-machine, the combination of a casing provided with two sets of fluid-pressure cylinders arranged in different planes and in parallel lines to a crank-shaft and having at least two cylinders in each set with the cylinders of a set arranged on opposite sides of the crank-shaft substantially at right angles to each other and in a transverse parallel line, a reciprocating piston in each cylinder, a rotating crank-shaft connected with the piston in each cylinder, a controlling-valve on each side of the crank-shaft, one for each lateral line of parallel-arranged cylinders and common to the cylinders of such line and arranged in a transverse parallel line with the cylinders of a set and operated to cut off fluid-pressure from and admit fluid-pressure to each cylinder in the line of laterally-arranged cylinders, and drill-holding mechanism connected with and adapted to be rotated by the crank-shaft, substantially as described.

3. In a portable pneumatic drilling-machine, the combination of a casing provided with two sets of fluid-pressure cylinders arranged in different planes and in lateral parallel lines with a crank-shaft and having at least two cylinders in each set with the cylinders of a set arranged on opposite sides of the crank-shaft substantially at right angles to each other and in a transverse parallel line, a reciprocating piston in each cylinder, a crank-shaft provided with a crank arranged opposite each of such cylinders and connected with the pistons in the cylinders of the set, a controlling piston-valve for each lateral line of cylinders arranged in a transverse line parallel with each other and with the cylinders of the set and connected with the crank-shaft to be operated thereby and having each valve provided with annular and longitudinal passages to regulate the admission and exhaust of the fluid-pressure during the motions of the controlling-valve to and from the cylinders of its line of laterally-arranged cylinders, and drill-holding mechanism connected with and adapted to be rotated by the crank-shaft, substantially as described.

4. In a portable pneumatic drilling-machine the combination of a casing provided with at least two sets of fluid-pressure cylinders arranged in parallel lines having two cylinders in each set substantially at right angles with each other, a reciprocating piston in each cylinder, a crank-shaft provided with a crank arranged opposite each set of cylinders and connected with the movable pistons therein, a valve-casing forming a cap for the cylinder-casing and provided with a fluid-pressure chamber and valve-chambers arranged at right angles to each other one for each line of parallel-arranged cylinders, a reciprocating piston-valve in each valve-chamber connected with the crank-shaft and provided with annular and longitudinal passages or chambers, channels leading from each valve-chamber to each cylinder in the line of parallel-arranged cylinders so as to provide for and cut off communication with the fluid-pressure chamber and each cylinder in the set during the reciprocations of the controlling piston-valve, and drill-holding mechanism connected with and adapted to be rotated by the crank-shaft, substantially as described.

5. In a portable pneumatic drilling-machine, the combination of a casing provided with at least two sets of fluid-pressure cylinders arranged in parallel lines having two cylinders in each set substantially at right angles with each other, a reciprocating piston in each cylinder, a crank-shaft provided with a crank arranged opposite each set of cylinders and connected with the movable pistons therein, a valve-casing forming a cap for the cylinder-casing and provided with a fluid-pressure chamber and valve-chambers arranged at right angles to each other one for each line of parallel-arranged cylinders, a reciprocating piston-valve in each valve-chamber connected with the crank-shaft and provided with annular and longitudinal passages or chambers, channels leading from each valve-chamber to each cylinder in the line of parallel-arranged cylinders so as to provide for and cut off communication with the fluid-pressure chamber of the valve-casing and each cylinder in the set during the reciprocations of the controlling piston-valve, a cap for each valve-chamber provided with an opening through which fluid-pressure may be exhausted, and drill-holding mechanism connected with and adapted to be rotated by the crank-shaft, substantially as described.

6. In a machine of the class described, a supply-pipe provided with a rotary throttle-valve in which there is combined a supply-pipe, an inwardly axial projecting tubular extension thereof perforated and immovably connected therewith so as to provide an annular chamber between it and the supply-pipe, a rotary valve in the inwardly-extending portion provided with a perforation adapted to register with the perforation in the extension, and a rotatable shell or handle portion surrounding the supply-pipe and extension thereof and connected with the valve so as to rotate both of such parts simultaneously, substantially as described.

7. In a portable pneumatic drill, the combination of a rotatable sleeve having a tapered recess adapted to receive the shank of a drill or similar tool, fluid-pressure cylinders and intermediate mechanism adapted to transform the energy in such cylinders into rotations of the tool-holder, a tubular extension on such tool-holder provided with an internal threaded and axial opening, a movable pin in such opening, and a threaded plug adapted to operate the pin backwardly and forwardly, substantially as described.

8. In a portable pneumatic drilling-machine, the combination of two lines of fluid-pressure cylinders, one line on each side of a crank-shaft having a cylinder on one side transversely opposite a cylinder on the opposite side with the two cylinders diagonal to each other and to a crank-shaft and having the cylinders of a set in a transverse parallel line, a valve for each line of cylinders common to all the cylinders in the line with the two valves also diagonal to each other and to the crank-shaft, a crank-shaft at the meeting-point of the diagonal lines of the cylinders and valves, a piston in each cylinder, means connecting and actuating the valves from the crank-shaft, a drill, and mechanism operating the drill by the rotation of the crank-shaft, substantially as described.

9. In a portable pneumatic drilling-machine, the combination of a casing, a system of cylinders arranged in sets within the casing and having one cylinder of each set on one side and the other cylinder of each set on the opposite side of a crank-shaft forming a line of cylinders on two sides of the crank-shaft, a fluid-pressure chamber common to all the cylinders, passages on each side of the casing, one passage for each cylinder on each side of the crank-shaft, valves, one for each line of cylinders, each valve controlling the passages to its respective line of cylinders, a crank-shaft, a piston in each cylinder connected with the crank-shaft, a drill, and mechanism for operating the drill by the rotation of the crank-shaft, substantially as described.

10. In a portable pneumatic drilling-machine, the combination of a main casing, a fluid-pressure chamber in said casing, passages leading from the fluid-pressure chamber on each side of the main casing, a valve controlling the passages from the fluid-pressure chamber on each side, a series of cylinders on each side of the main casing in communication with the fluid-pressure chamber through the side passages and valves, a crank-shaft operated by the cylinders, and a drill mechanism operated by the crank-shaft, substantially as described.

11. In a portable pneumatic drilling-machine, the combination of a main casing, a cap or cover at one end of the main casing having a pressure-chamber therein, a passage in the main chamber communicating with the source of pressure-supply and the pressure-chamber of the cap, passages on opposite sides of the pressure-chamber leading one each to a pressure-cylinder, a valve-casing for each side of the cap, and a valve in each casing having ports and passages controlling the passages from the pressure-chamber and supplying pressure to the cylinders, substantially as described.

12. In a portable pneumatic drilling-machine, the combination of a main casing, a cap or cover at one end of the main casing having a pressure-chamber therein, a passage in the main chamber communicating with the source of pressure-supply and the pressure-chamber of the cap, passages on opposite sides of the pressure-chamber leading one each to a pressure-cylinder, a valve-casing for each side of the cap, a valve in each casing, an annular passage around the exterior of each valve, a longitudinal passage through each valve, a port from the pressure-chamber communicating with the annular passage around the valve, a port at each end of the valve-casing communicating with the longitudinal passage of the valve and with the pressure-chamber passages, a port through the wall of the valve at each end communicating with the longitudinal passage in the valve and with the ports of the side passages, and means for reciprocating the valves to control the admission of fluid-pressure to and the exhaust of fluid-pressure from the cylinders, substantially as described.

13. In a portable pneumatic drilling-machine, the combination of a main casing having at one end a cap, a pressure-chamber in the cap, a passage from the pressure-chamber leading to a pressure-cylinder, a second passage from the pressure-chamber leading to a second pressure-cylinder on the same side of a crank-shaft, a valve-casing at the side of the pressure-chamber having communication with the passages of such chamber, and a reciprocating valve in the valve-casing having passages and ports communicating with the pressure-chamber and with the passages leading therefrom to the pressure-cylinders, substantially as described.

14. In a portable pneumatic drilling-machine, the combination of a main casing having at one end a cap, a pressure-chamber in the cap, a passage from the pressure-chamber leading to a pressure-cylinder, a second passage from the pressure-chamber leading to a second pressure-cylinder, two pressure-cylinders in the main casing, a valve-casing at the side of the pressure-chamber of the cap having communication with the passages of such chamber, a reciprocating valve in the valve-casing, an annular passage on the exterior of the valve communicating with the pressure-chamber, a longitudinal passage through the valve, a port at each end of the longitudinal passage communicating with the passage and with the passages leading from the pressure-chamber, a crank-shaft, and means for reciprocating the valves from the crank-shaft, substantially as described.

HENRY J. KIMMAN.

Witnesses:
THOMAS F. SHERIDAN,
THOMAS B. MCGREGOR.